United States Patent [19]

Sweet

[11] Patent Number: 5,685,107
[45] Date of Patent: Nov. 11, 1997

[54] FISHING ROD HOLDER

[76] Inventor: Paul Arlin Sweet, Rte. One, Box 150, New Madrid, Mo. 63869

[21] Appl. No.: 496,930

[22] Filed: Jun. 30, 1995

[51] Int. Cl.$^6$ .................................................. A01K 97/10
[52] U.S. Cl. ........................................................ 43/21.2
[58] Field of Search ........................... 43/21.2; 248/512, 248/513, 514, 520, 534, 539

[56] References Cited

U.S. PATENT DOCUMENTS

| | | | |
|---|---|---|---|
| 2,311,823 | 2/1943 | Gaskill | 43/21.2 |
| 3,444,643 | 5/1969 | Dobbs | 43/21.2 |
| 3,992,798 | 11/1976 | Schmitt | 43/21.2 |
| 4,366,640 | 1/1983 | Clapp | 43/21.2 |
| 4,640,038 | 2/1987 | Jershin | 43/21.2 |
| 4,642,931 | 2/1987 | Flores | 43/21.2 |
| 4,753,029 | 6/1988 | Shaw | 43/21.2 |
| 4,964,233 | 10/1990 | Benson | 43/21.2 |
| 5,014,458 | 5/1991 | Wagner | 43/21.2 |
| 5,088,224 | 2/1992 | Gutierrez | 43/21.2 |

*Primary Examiner*—Kurt Rowan
*Attorney, Agent, or Firm*—Banner & Witcoff, Ltd.

[57] ABSTRACT

An improved fishing rod holder is capable of simultaneously supporting a plurality of fishing rods during fishing operations. The apparatus comprises a base plate for mounting the apparatus onto a boat or other platform, a central support that extends upward from the base plate, a cross-member attached to the central support and extending outward from the central support, and a plurality of fishing rod cradles spaced at intervals along the cross member. Each fishing rod cradle supports an individual fishing rod oriented in a desired direction, at a desired inclination.

2 Claims, 3 Drawing Sheets

FISHING ROD HOLDER

BACKGROUND OF THE INVENTION

1. Field of the Invention

The present invention relates generally to devices for holding fishing rods or poles during fishing operations. More specifically, the invention is a fishing rod holder that is mountable onto a boat or other platform, and is capable of simultaneously supporting a plurality of fishing rods to allow hands-free fishing.

2. Discussion of the Prior Art

In some forms of fishing, a lure or bait is repeatedly cast into the water and retrieved. In those situations, the person doing the fishing must hold the fishing rod at all times.

However, in many other forms of fishing, it is not necessary or desirable for the fisherman to hold onto the fishing rod at all times.

For instance, in some forms of fishing, the bait or lure is cast into the water, either from the shore or from a boat, and is then allowed to remain in the water until a fish strikes. Since the bait is not being constantly cast and retrieved, there is no need for the fisherman to hold the fishing rod until a fish strikes the bait.

Similarly, another common way to fish is to "troll" for fish, by trailing a line from a fishing rod behind a slowly moving boat, with a bait or lure attached to the end of the line. This allows a wide area of water to be covered, without the need to constantly cast and retrieve the bait. Once a fish is hooked, the boat is stopped and the fish is played to the boat in a normal manner. Again, until a fish is hooked, there is no need for the fisherman to hold the fishing rod in his or her hands. Indeed, in trolling the movement of the bait and the line through the water causes significant dragging forces, which can make holding the fishing rod for extended periods difficult and tiring. Moreover, if each fishing rod is held fisherman can only handle a single rod. This limits the number of lines that can be trolled behind the boat, decreasing the chances of hooking a fish.

Through the years, a variety of approaches have been used to hold a fishing rod in place while waiting for a fish to strike the bait, to allow hands-free fishing, and to allow a single fisherman to manage several fishing rods at once. For instance, for fishing from shore, hollow tubes have been used, which are thrust into the ground, with the fishing rod being inserted into the open end of the tube. The rod is thus supported in place while waiting for a fish to strike the bait, allowing the fisherman to carry on other activities without holding onto the rod. When a fish strikes the bait, the rod is removed from the rod holder, and the fish is played in a normal manner.

Similar devices have also been developed for use on boats. For instance, on sport fishing boats, individual tubes have been mounted onto the rails of boats, or onto chairs. Again, the base end of a fishing rod is inserted into the tube, which supports the rod in a desired position until a fish is hooked.

Other non-tubular devices have been developed that are mounted onto the deck or rail of a boat or other platform, and are adapted to receive the handle end of a fishing rod. Each device holds a single fishing rod, at a single orientation.

Despite these efforts to provide suitable rod holders, the existing prior art devices are limited in many respects. Most notably, the prior art has not provided a simple unitary rod holder assembly that is capable of holding a plurality of fishing rods in place at a single time. Nor has the prior art provided a rod holder for holding multiple rods that can be mounted onto a boat or other rigid platform, while allowing the direction and inclination of each rod to be independently varied according to the needs of a particular situation. Finally, the prior art has not provided a device that is easily assembled and disassambled, and is strong enough to withstand the forces that are exerted when trolling with multiple rods.

Thus, it is an object of the present invention to provide a fishing rod holder that is capable of simultaneously supporting a plurality of fishing rods during fishing operations.

It is a further object of the present invention to provide such a fishing rod holder that allows the direction and inclination of each fishing rod to be independently adjusted.

It is a further object of the present invention to provide a fishing rod holder that is durable and easy to manufacture, using inexpensive and readily available materials.

It is a further object of the present invention to provide a fishing rod holder that is easy to assemble and install, and which can be readily removed from service and disassembled when not in use.

SUMMARY OF THE INVENTION

These and a number of additional objects are obtained through the present invention. In a basic aspect, the present invention is a fishing rod holder that is capable of simultaneously supporting a plurality of fishing rods during fishing operations. The apparatus comprises a base plate for mounting the apparatus onto a boat or other platform, a central support that extends upward from the base plate, a crossmember that is attached to the central support and extends outward from the central support, and a plurality of fishing rod cradles spaced at intervals along the cross member, each of which supports an individual fishing rod pointed in a desired direction, at a desired inclination.

The apparatus is durable and easy to manufacture, using inexpensive and readily available materials. In addition, the apparatus is easy to assemble and install, and can be readily removed from service and disassembled when not in use.

DESCRIPTION OF THE PREFERRED EMBODIMENTS

Figure 1:
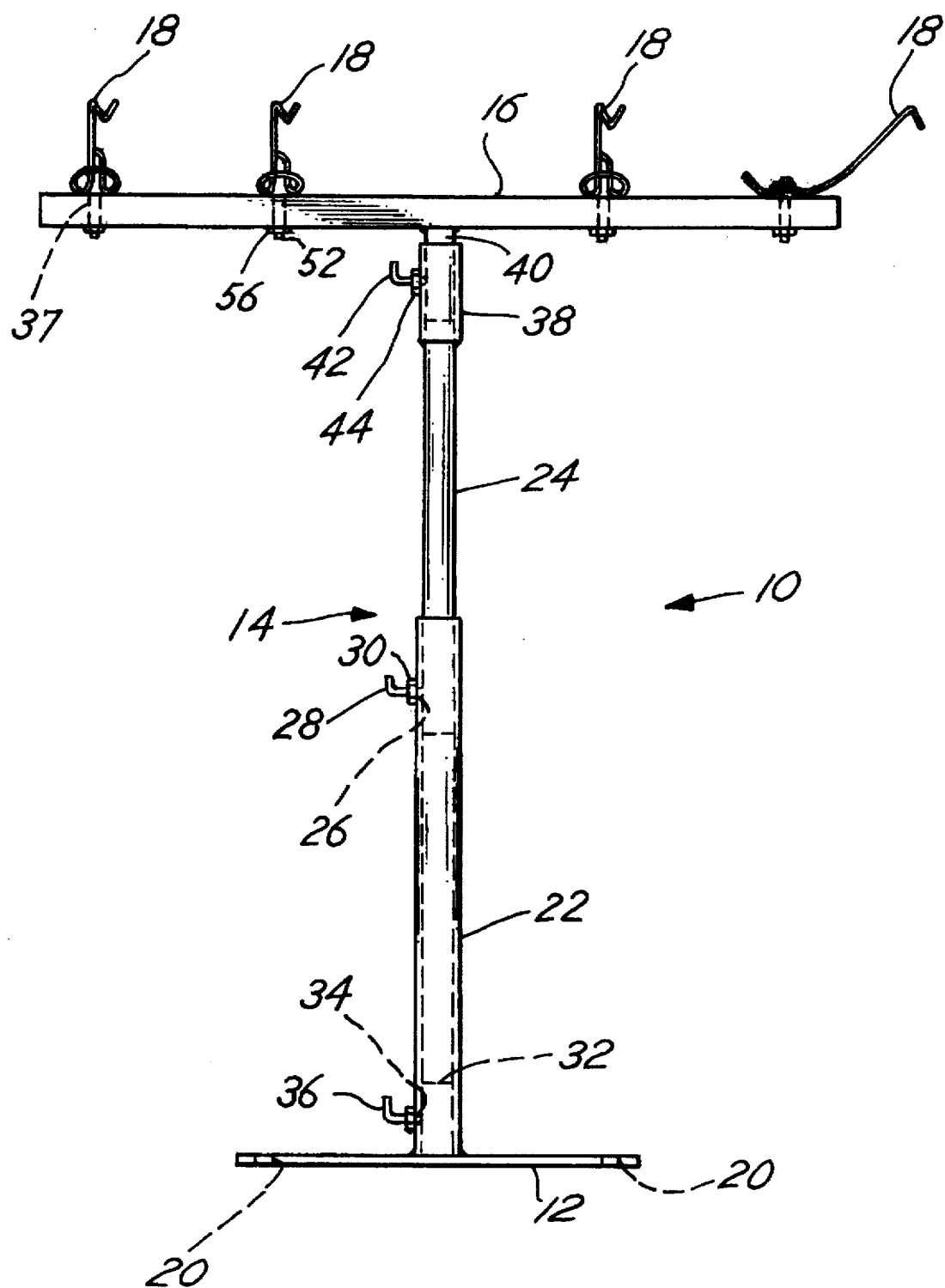
FIG. 1 of the drawing is a front view of a preferred embodiment of the present invention, showing the details thereof.

The details of the preferred embodiment of the present invention are shown in FIGS. 1–4 of the drawing. Turning to FIG. 1, a fishing rod holder 10 generally comprises a base plate 12, a central support 14, a cross member 16 and a plurality of fishing rod cradles 18.

The base plate 12 is preferably a 4 inch by 6 inch rectangular piece of ¼ inch stainless steel plate, with a hole 20 at each corner for use in mounting the base plate 20 to a boat or other platform.

The central support 14 is attached to the base plate 12, extending upward from the base plate 12. In the preferred embodiment shown in the Figures, the central support 14 is a rigid telescoping tube assembly comprising a hollow lower tube 22, and a hollow upper tube 24 that is slidably inserted into the lower tube 22. The outer diameter of the upper tube 24 should be approximately the same as the inner diameter of the lower tube 22, while allowing the upper tube 24 to slide within the lower tube 22. In the preferred embodiment, the lower tube 22 has an outer diameter of 1¼ inches, with a wall thickness of 1/16 inch, and length of 6 to 18 inches. The inner tube has an outer diameter of approximately 1 1/16 inch, with a wall thickness of ⅛ inch, and a length of 6 to 18 inches.

A threaded bore 26 is provided near the top end of the lower tube section 22, for receiving a set screw 28. The threaded bore 26 can be created by drilling a hole through one wall of the lower tube section, and forming threads within the hole. Preferably, however, the threaded bore 26 is created by drilling a hole through one wall of the lower tube 22, and welding a threaded nut 30 onto the outer surface of the lower tube 22, in alignment with the hole. The overall length of the central support 14 is adjusted by moving the upper tube 24 to a desired position within the lower tube 22, and then tightening the set screw 28 against the upper tube 24 to hold the upper tube 24 in place.

To allow disassembly of the apparatus 10, the central support 14 should preferably be removable from the base plate 12. To accomplish this, the base plate 12 includes a short cylindrical post 32, having an outer diameter approximately equal to the inner diameter of the lower tube 22. The post 32 is welded to the base plate 12 and extends upward from the base plate 12. To attach the central support 14 onto the base plate 12, the lower end of the lower tube 22 is fitted over the post 32, with the post 32 inside the internal cavity of the lower tube 22. A threaded bore 34 is provided near the bottom end of the lower tube 22, for receiving a set screw 36. Once the lower tube 22 is fitted onto the post 32, the set screw 36 is tightened against the post 32 to hold the central support 14 in place.

The cross member 16 is preferably 1 inch square steel tubing, with a wall thickness of 1/16 inch, and is approximately 3 feet long. A plurality of vertical bores 37 pass through the cross member 16 at spaced intervals along the cross member 16. The cross member 16 is attached to the central support 14 in a manner similar to that used for connecting the central support 14 to the base plate 12. As shown in FIG. 1, a sleeve 38, approximately three inches long and having an inner diameter approximately the same as the outer diameter of the upper tube 24, is fitted over the end of the upper tube 24 and welded into place. A short post 40, having an outer diameter approximately the same as the inner diameter of the sleeve 38, extends from the cross member 16. To install the cross member 16 onto the central support 14, the post 40 is inserted into the sleeve 38, and is held in place by a set screw 42 extending through a threaded bore 44 in the sleeve 38.

While the threaded bore/set screw assembly described above for locking the central support 14 to the base plate 12, and for locking the upper tube 24 to the lower tube 22, and for locking the cross member 16 to the central support 14 is the preferred means for accomplishing that function, it will be readily apparent to persons of ordinary skill that other means, including welds, cotter pins, bolts, meshing threads, clamps or the like can also be used to secure these various components together.

One benefit of using the threaded bore/set screw arrangement described above to secure the base plate 12, the central support 14 and the cross member 16 to one another is that one or more of the set screws 28, 36 or 42 can be adjusted to a tension that will hold the associated components in a fixed position under normal conditions, but will allow them to move with respect to one another if a severe twisting force is imparted to the apparatus 10, such as might occur when a line from one of the fishing rods becomes snagged on some underwater structure. Without this feature, the force would be transmitted directly through the central support 14 to the base plate 12, potentially causing the base plate 12 to shear away from the surface on which it is mounted. Thus, the use of a set screw to lock the central support 14 to the base plate 12, and to lock the cross member 16 to the central support 14, and to lock the upper tube 24 to the lower tube 22, provides a locking means that is releasable upon the application of a predetermined maximum force, to act as a safety mechanism.

Figure 2:
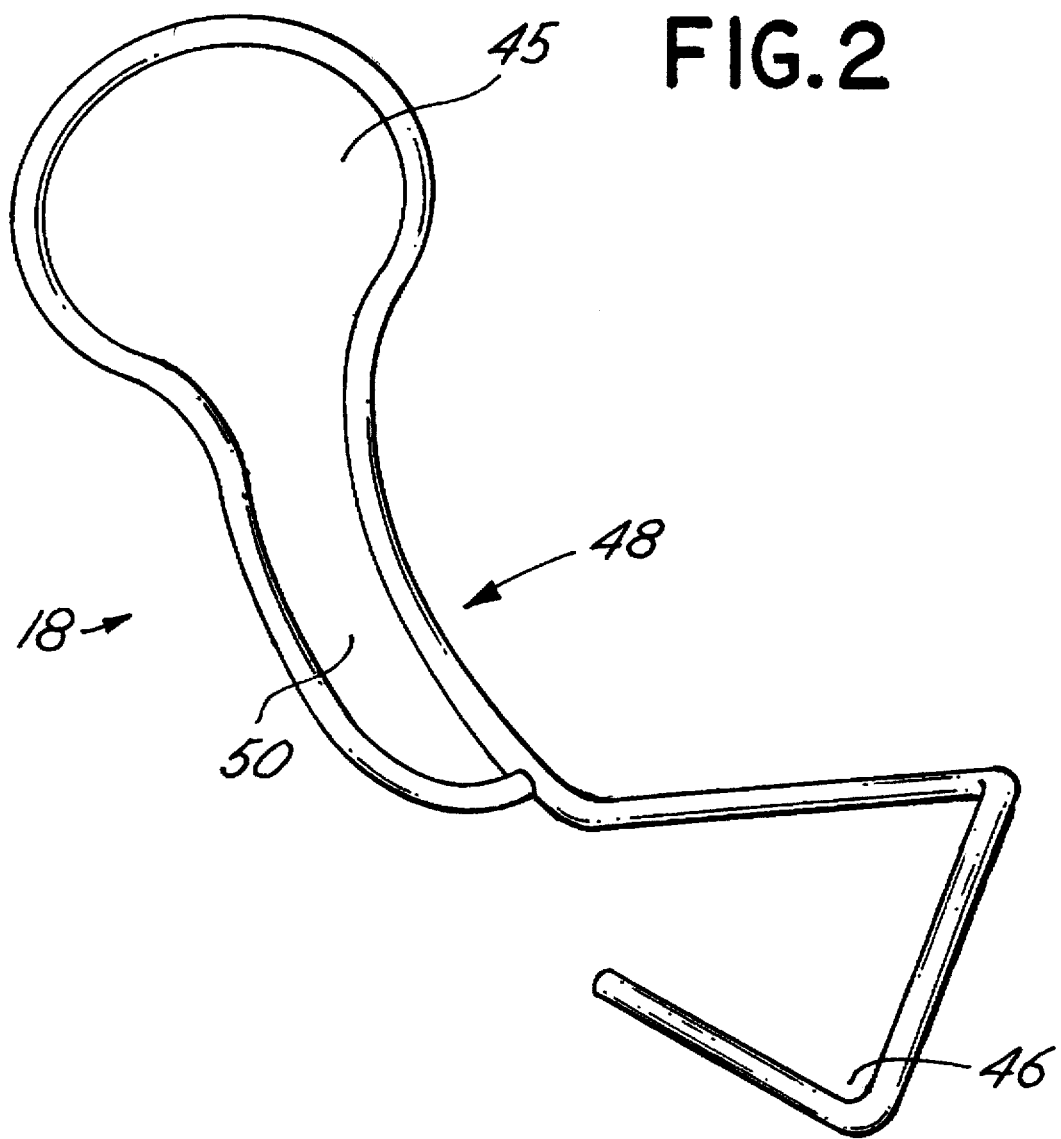
FIG. 2 of the drawing is an isometric view of a preferred embodiment of a fishing rod cradle associated with the present invention.

As shown in FIG. 1, a plurality of fishing rod cradles 18 are attached to the cross member 16 at spaced intervals. Turning to FIG. 2, each fishing rod cradle 18 is made from a single length of 3/16 inch steel rod, bent to the shape shown in FIG. 2. The fishing rod cradle includes a closed loop 45 at one end for receiving and controlling the butt end of a fishing rod, and a hook 46 at the other end for supporting the remainder of the fishing rod. Between the closed loop 45 at one end of the fishing rod cradle 18 and the hook 46 at the other end of the fishing rod cradle 18 is a middle section 48, where a narrow channel 50 is formed between two parallel portions of the steel rod used to form the cradle 18.

Figure 3:
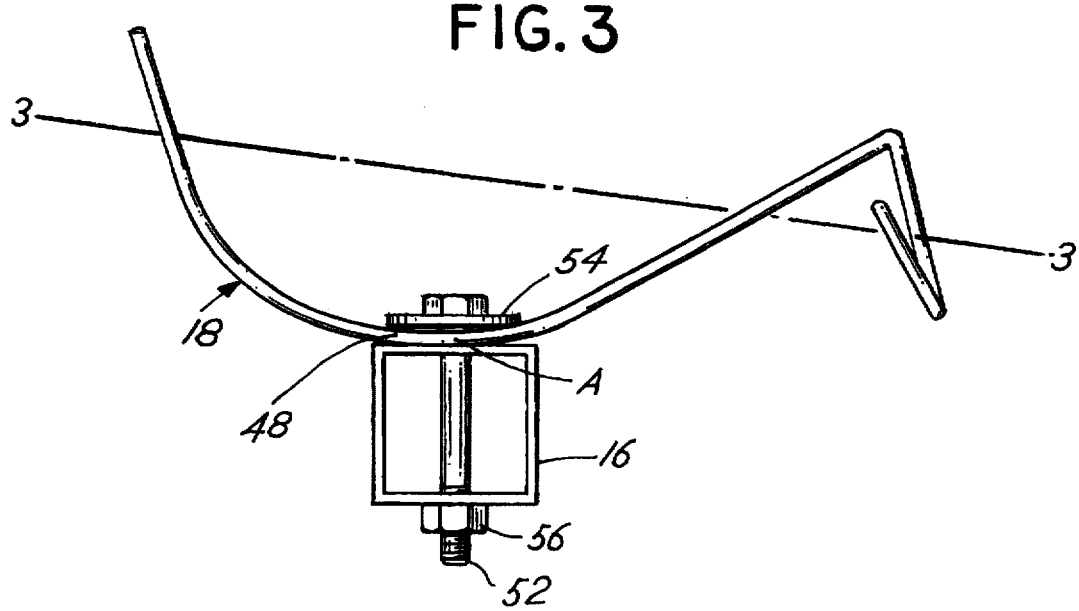
FIG. 3 of the drawing is a side view of the cross member of FIG. 1, with a fishing rod cradle mounted thereto and oriented in a first position.
Figure 4:
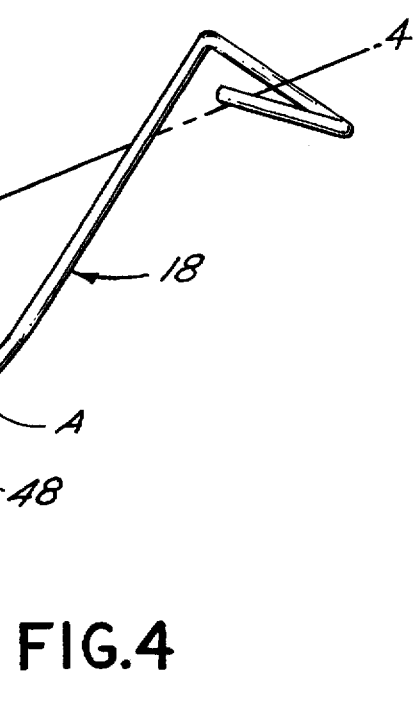
FIG. 4 of the drawing is a view similar to that shown in FIG. 3, with the fishing rod cradle oriented in a second position.

As shown in FIGS. 3 and 4, each fishing rod cradle 18 is mounted to the cross member using a bolt 52, in combination with a flat washer 54 and a nut 56. The bolt 52 extends through the channel 50 in the cradle 18, and through the bore 36 in the cross member 16, with the flat washer 54 bridging across the channel 50 of the cradle 18. The bolt 52 and the fishing rod cradle 16 are held firmly in place by the nut 56.

As shown in FIGS. 3 and 4, the middle portion 48 of the fishing rod cradle 18 is slightly curved, when viewed from the side. As a result, the degree of tilt of the fishing rod cradle 18 with respect to the cross member 18 can be easily adjusted by loosening the nut 56, and then sliding the fishing rod cradle forward or backward until the washer 54 contacts the cradle 18 at a different point. The nut 56 is then retightened, fixing the fishing rod cradle in its new position. For instance, in FIG. 3, the washer 54 contacts the fishing rod cradle 18 at Point A, causing the fishing rod to point along the axis 3—3. In FIG. 4, the washer 54 contacts the fishing rod cradle 18 at Point B, causing the fishing rod to point along the axis 4—4. In addition, each fishing rod cradle can be adjusted from side to side by rotating the fishing rod cradle 18 about the axis of the bolt 52. Thus, each fishing rod cradle 18 can be independently adjusted through a range of different directions and inclinations, independent of the other fishing rod cradles 18.

While in the foregoing, there have been described various preferred embodiments of the present invention, it should be understood to those skilled in the art that various modifications and changes can be made without departing from the true spirit and scope of the invention as recited in the foregoing claims.

For instance, while the central support 14 is preferably a telescoping tube, it can also be a non-telescoping tube, or an A-frame assembly, or a tripod assembly, or any other structure that will elevate the cross member 16 above the base plate 12.

Similarly, while the cross member 16 is preferably a straight hollow tube, it can have any other shape that can be extended from the central support 14, while supporting a plurality of fishing rod cradles 18.

In addition, while a specific preferred fishing rod cradle assembly 18 has been described herein, it will be readily apparent to persons of skill in the art that other structures, such as tubes or clamps may be used to support the individual rods. In addition, other assemblies, such as a locking ball-in-socket assembly, or a locking pressure plate assembly, can be used to provide selective adjustment of the direction and inclination of the individual fishing rod cradles 18.

Finally, while the structures disclosed herein are preferably made of stainless steel, it will be readily apparent to persons of ordinary skill that a variety of other materials can be used, including other metals, hard plastics, fiberglass or the like.

What is claimed is:

1. A fishing rod holder capable of simultaneously supporting a plurality of fishing rods comprising, in combination:

a base plate, said base plate including an upwardly projecting support post attached thereto;

a rigid, hollow, cylindrical support tube, said tube having opposite hollow, open ends and a through passage, one end being fitted over the post on the base plate;

a fastener for removably attaching the tube to the base plate post;

a telescoping tube with a lower end fitted into the opposite end of the supporting tube and an upper end, said telescoping tube including a hollow sleeve at the upper end;

an adjustable fastener for attaching the telescoping tube in the support tube;

a horizontal cross member with a depending post at the mid-point, said cross member post telescopically inserted into the hollow sleeve;

a plurality of fishing rod cradles each cradle adjustably attached to the cross member, each cradle comprising a formed rod having at one end parallel portions of rod defining a channel with a closed loop to receive the butt end of a fishing rod, and at the opposite end an open loop for receipt of the fishing rod; and means for fastening each cradle to the cross member by cooperation with the channel.

2. The holder of claim 1, including a fastener for attaching the sleeve to the depending post.

* * * * *